3,150,942
METHOD OF PURIFYING A HYDROGEN GAS STREAM BY PASSING SAID GAS IN SERIES THROUGH 13X AND 4A OR 5A MOLECULAR SIEVES
Srini Vasan, Brooklyn, N.Y., assignor to Chemical Construction Corporation, New York, N.Y., a corporation of Delaware
Filed Oct. 19, 1959, Ser. No. 847,246
8 Claims. (Cl. 55—31)

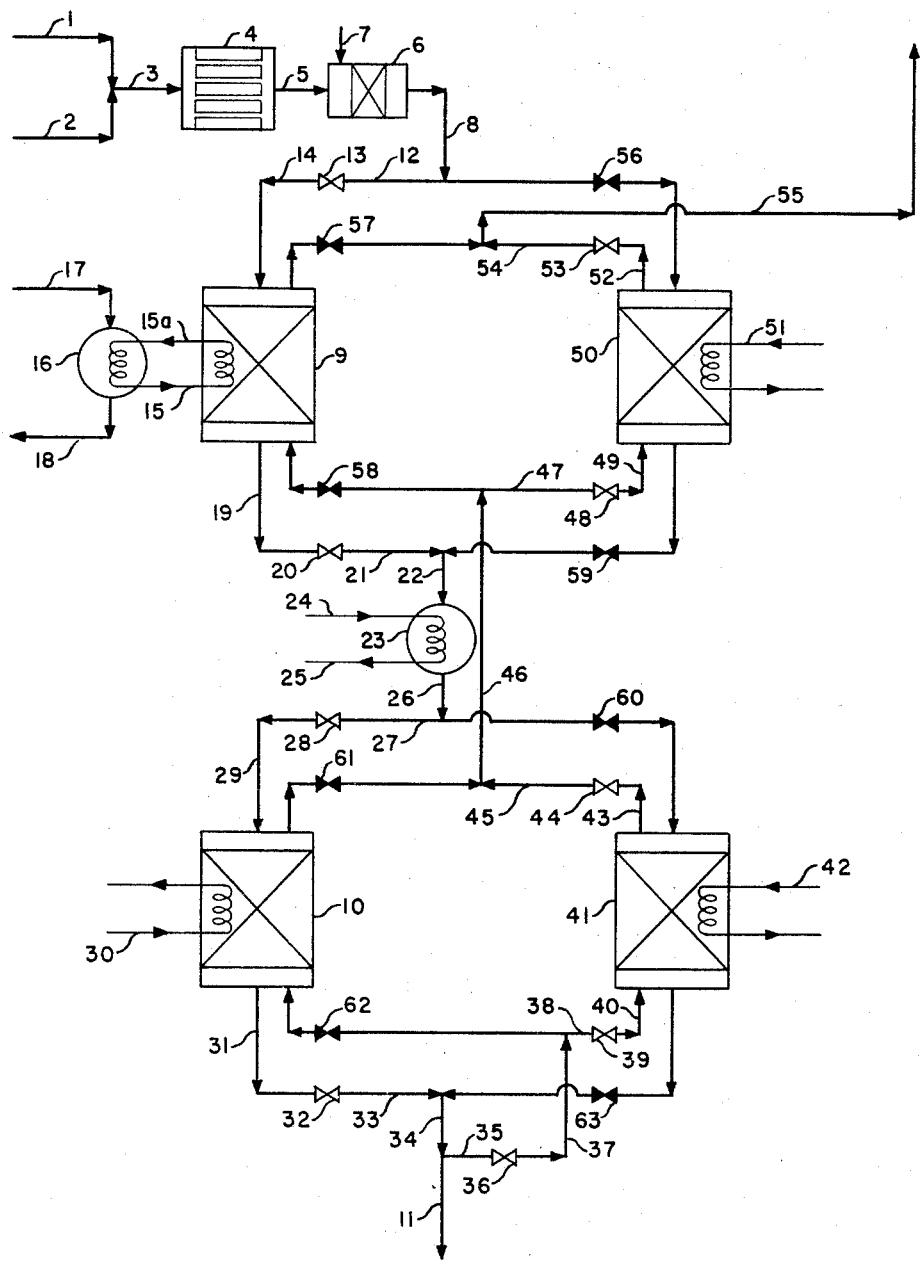

This invention relates to the purification of hydrogen. A process involving the use of the selective zeolitic adsorbents known as molecular sieves has been developed, which achieves the economical and complete removal of impurities such as carbon dioxide, water vapor and carbon monoxide from a crude hydrogen gas stream. Two distinct types of molecular sieve are employed in series. Selective adsorption of impurities takes place, which results in improved regeneration efficiency. An additional improvement involves the regeneration cycle, in which the impurity-laden purge gas from the second bed is also utilized to purge the first bed.

Hydrogen is produced in commercial quantities according to several well-known procedures, such as natural gas reforming, partial oxidation of hydrocarbons, reforming of refinery off-gases, and treatment of coke-oven or blast-furnace gases. In these processes the hydrocarbon is reacted with water vapor or oxygen, and a gas stream containing hydrogen, carbon monoxide and carbon dioxide is produced. Additional water vapor is added to the gas stream and catalytically reacted with the carbon monoxide component, to produce further hydrogen and carbon dioxide. A final crude hydrogen product is produced, which contains large amounts of carbon dioxide and water vapor as major impurities. A minor amount of residual carbon monoxide is also present, and other minor impurities, such as methane and nitrogen, may also be included in the gas stream. The process of this invention is directed to the purification of this crude hydrogen stream. It should be noted that the above description of crude hydrogen production is merely an outline of the process and omits much specific processing detail. In some cases the raw material consists of a gas stream containing principally carbon monoxide. In these cases the major processing step is merely the catalytic oxidation of carbon monoxide with water vapor.

Most of the hydrogen which is commercially produced is subsequently utilized in catalytic processes such as ammonia synthesis and organic hydrogenations. These processes require a hydrogen gas which is almost completely free of impurities. Some of the impurities, such as carbon monoxide, act as strong catalyst poisons. The major impurities such as water vapor and carbon dioxide must be removed since they dilute the product gas stream and also because of adverse effects in catalytic reactions.

The purification of hydrogen is a well-developed industrial procedure. Numerous gas scrubbing processes have been developed, involving the use of alkali carbonates, ethanolamines and other materials in scrubbing solutions to remove carbon dioxide. The removal of final portions of carbon monoxide has been commercially achieved by catalytic methanation, which reacts the carbon monoxide with hydrogen to yield the relatively innocuous components methane and water vapor. Another well-known process for removal of final portions of carbon monoxide and carbon dioxide employs an ammoniated aqueous copper salt solution at elevated pressure as a scrubbing solution.

These processes produce pure hydrogen which is commercially usable, however, numerous drawbacks and objectionable features are found in practice of the aforementioned purification technology. Costly and corrosive materials are employed, high pressures and expensive equipment are required in some cases, and energy requirements are a considerable factor.

In the present invention, selective zeolite adsorbents commonly known as molecular sieves are employed to purify the crude hydrogen. These adsorbents are distinguished from other known adsorbents in that molecular sieves possess uniform adsorption openings of constant dimension in the crystal structure. Thus molecular sieves selectively adsorb materials on the basis of unit molecular size. Compounds having large molecular configurations such as cross-linked polymers, certain polycyclic compounds and proteins are not adsorbed. Also, non-polar compounds of relatively small molecular configuration such as hydrogen may be temporarily adsorbed but are readily displaced by other molecules having polar characteristics or somewhat larger molecular dimensions.

The chemical composition of molecular sieve consists of a synthetic alkali-metal aluminosilicate zeolite formulation, quite similar to some natural clays and feldspars. The crystals as synthesized have a three-dimensional crystal structure containing water of hydration. When the water is driven off by heating, the crystal does not collapse or rearrange, as is the case with most other hydrated materials. Instead, the physical structure of the crystal remains unchanged which results in a network of empty pores and cavities that comprise about one-half of the total volume of the crystals.

Physically, molecular sieves are white powders with particles ranging from one to three microns in diameter. Each particle is a single crystal which contains literally billions of tiny cavities or cages interconnected by channels of unvarying diameter. The size and position of the metal ions in the crystal control the effective diameter of the interconnecting channels. Thus, due to their unique crystal structure, the term "pore size distribution" usually specified in relation to adsorbents is not applicable to molecular sieves since both the cavities and pores are precisely uniform in size. This uniformity, which permits a sieving or screening action based on molecule size, is the unusual characteristic of molecular sieves which is utilized in the present invention.

The broad usage of molecular sieve compositions in hydrogen purification has previously been suggested, especially in terms of drying a moisture-laden hydrogen gas. The present invention takes advantage of the fact that molecular sieves are formulated with varying chemical compositions, so as to yield products possessing various standard pore sizes of constant dimension, depending on the particular chemical composition.

The general chemical formula for a molecular sieve composition known commercially as type 13X is

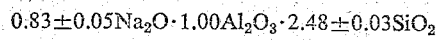

plus water of hydration. Type 13X has a cubic crystal structure which is characterized by a 3-dimensional network with mutually connected intra-crystalline voids accessible through pore openings which will admit molecules with critical dimensions up to 13 angstroms. The void volume is 51 volume percent of the zeolite and all adsorption takes place in the crystalline voids.

Another molecular sieve composition, known commercially as Type 4A, has the general chemical formula $$0.96 \pm 0.04 Na_2O \cdot 1.00 Al_2O_3 \cdot 1.92 \pm 0.09 SiO_2$$

plus water of hydration. Type 4A is converted into commercial Type 5A by an ion exchange procedure, in which about 75% of the sodium ions are replaced by calcium ions. Types 4A and 5A have a cubic crystal structure characterized by a 3-dimensional network consisting of cavities 11.4 angstroms in diameter separated by circular pore openings 4.2 angstroms in diameter. Removal of crystal water leaves mutually connected intra-crystalline voids amounting to 45 volume percent of the zeolite. All adsorption takes place in the intra-crystalline voids. Although the pore diameter of both 4A and 5A is 4.2 angstroms, the effective pore diameter is determined by the cation and its position in the structure. Type 4A, the sodium zeolite, will permit only molecules smaller than about 4 angstroms to enter the cavities and be absorbed. Type 5A, the calcium zeolite, will admit molecules up to about 5 angstroms in diameter.

It is an object of this invention to more effectively employ molecular sieves in the purification of hydrogen.

Another object of this invention is to purify hydrogen in an improved process by contact with two types of molecular sieve in series.

A further object of this invention is to employ molecular sieves for hydrogen purification in an improved cyclic process.

An additional object of this invention is to purge and regenerate impurity-laden molecular sieves in an improved and more economical manner.

Still another object of this invention is to alternately cool and heat molecular sieve beds in a cyclic process by an improved method.

These and other objects of this invention will become apparent from the description which follows.

In the present invention, hydrogen purification is accomplished by passing the impure gas stream through two dissimliar molecular sieve beds in series. Type 13X sieve is employed in the first bed, and removes all water vapor and most of the carbon dioxide. The partially purified gas stream then passes through the second bed, which consists of either 4A or 5A type sieve. A final purification is accomplished, to yield a pure hydrogen containing a maximum of 0.2% impurities and free of carbon monoxide, carbon dioxide and water vapor. One of the major advantages of this procedure is that all water vapor and most of the carbon dioxide are removed on Type 13X sieve, which is more readily regenerated and freed of these impurities than Types 4A or 5A. The purification to high purity hydrogen is more readily accomplished using 4A or 5A. Thus the combination employed in this process results in more effective and economical operation, and permits the practical application of molecular sieve purification to crude hydrogen gas streams containing relatively large proportions of carbon dioxide and water vapor.

Another novel aspect of this invention involves the regeneration of the impurity-laden sieve beds. The process is operated in practice by passing crude gas through one set of 13X-4/5A sieve beds until a "breakthrough" point is reached. The beds at this point are laden with sufficient impurity so that the impurity level in the product gas suddenly rises from the previous low and constant value. The crude gas is then switched to an alternate set of beds and the impurity-laden beds are regenerated by heating and purging. An inert purge gas, such as previously purified hydrogen, is employed to sweep out impurities. It has been found that this purging may be effectively accomplished by utilizing the same purge gas for both beds, in a tandem flow. Thus the purge gas is first passed through the second bed of 4A or 5A sieve, and the resulting gas containing impurity is then further utilized to purge the first bed of 13X sieve. An effective and economical regeneration results, with a considerable saving of purge gas.

These and other novel features of the present invention are indicated on the flow diagram of the process. Referring to the figure, a hydrocarbon stream 1 such as natural gas containing principally methane, or refinery off-gas containing higher hydrocarbons such as propane and butane, and process steam feed 2 are combined in proper proportions to produce a reformer furnace feed 3 which is passed into the tubes of catalytic reformer furnace 4. The furnace product stream 5 which results contains principally hydrogen and carbon monoxide, plus quantities of carbon dioxide, water vapor, methane and traces of inerts such as nitrogen. If hydrocarbon stream 1 consists of oil or coal, a partial oxidation process may be employed in which case stream 1 and oxygen stream 2 would be separately admitted into unit 4 which would consist of a high-temperature non-catalytic furnace followed by a quench. The product stream 5 would contain primarily hydrogen, carbon monoxide and carbon dioxide, with possibly small amounts of free carbon and ash, methane and inerts including nitrogen and argon also present. A filter or other means, not shown, would be employed to remove solids. In cases where the raw material for the process is a blast furnace or coke oven gas containing principally carbon monoxide, the reforming in unit 4 would be omitted from the process and the raw material gas stream would be passed directly to CO-oxidation converter 6 described infra.

The product stream 5 in either case is then passed into catalytic CO-oxidation converter 6, together with additional water vapor admitted via 7. In converter 6, CO is catalytically reacted with water vapor to yield additional hydrogen together with carbon dioxide. A final crude hydrogen stream 8 is produced, containing as principal impurities carbon dioxide and water vapor, as well as minor impurities such as carbon monoxide, methane, nitrogen and argon. Stream 8 now passes into the molecular sieve purification stages.

The figure shows both the adsorption and regeneration cycles, with the adsorption process taking place in units 9 and 10 on the left side of the figure and yielding a final pure hydrogen product stream 11. A simultaneous regeneration process is shown taking place on the right side of the figure. Under these circumstances, valves which are closed are shown in solid black in the figure.

Stream 8 passes via line 12, valve 13 and line 14 into molecular sieve unit 9. Unit 9 contains a bed of molecular sieve Type 13X, and adsorbs essentially all water vapor and carbon dioxide from the gas stream. The adsorption process generates heat, and cooling is accomplished by means of cooling coils 15. Unit 9 is thereby maintained at an adsorption operating temperature between 70° F. and 150° F. An operating temperature higher than 150° F. would result in incomplete removal of carbon dioxide and water vapor, and a temperature lower than 70° F. does not achieve significantly better results and becomes more expensive due to refrigeration requirements.

In a preferred embodiment of this invention, a closed circulating water flow is maintained in coil 15 and this water is of a purity at least as high as steam condensate water. The heated pure water flows via line 15a to an external cooler 16 where it is cooled to recycle temperature by ordinary plant cooling water admitted via 17 and removed via 18. Thus the introduction of impurities into coil 15 is avoided, and unit 15 may be used both for cooling and also for steam heating during the subsequent regeneration period without contaminating process steam or scaling the coils.

The gas stream, now free of carbon dioxide and water vapor, leaves unit 9 via line 19 and passes via valve 20 and lines 21 and 22 into refrigeration unit 23. Unit 23 is supplied with a cooling medium such as brine or other suitable refrigerant via line 24, and warmed refrigerant is removed via 25. The purpose of this further gas stream cooling is to insure complete carbon monoxide adsorption in the subsequent molecular sieve bed. The gas stream is cooled to at least 30° F. as a maximum, however, if other components such as methane and nitrogen are to be completely removed it may be necessary to cool down to as low as minus 40° F. In the latter case, brine would not be a suitable refrigerant and other refrigerating means would be employed.

The cooled gas leaves refrigeration unit 23 via line 26, and passes via line 27, valve 28 and line 29 into molecular sieve unit 10. Unit 10 contains a bed of molecular sieve, either Type 4A or Type 5A. In this particular situation, Type 5A is the preferred adsorbent due to slightly greater adsorption capacity, however, Type 4A is also suitable. The bed in unit 10 may be cooled by refrigerant coil 30 to compensate for temperature rise due to adsorption. Only a small amount of cooling is required here since the quantity of material adsorbed is relatively small. In some cases the preliminary cooling in unit 23 may be sufficient to insure complete adsorption in unit 10 without the necessity of further cooling in the bed itself, and unit 30 may not be required.

The completely purified hydrogen gas now leaves unit 10 via line 31, and passes via valve 32 and lines 33, 34 and 11 to final product utilization or storage. Depending on the particular subsequent process requirements, the degree of purification achieved may be readily varied. The preferred product will contain at least 99.8% hydrogen with the balance inerts, and will be essentially free of carbon dioxide, carbon monoxide and water vapor.

The figure also shows the regeneration cycle. Regeneration is preferably accomplished with the utilization of a portion of the purified hydrogen as the purge gas stream. As previously mentioned, it has been found that the same purge gas stream may be efficiently utilized in the present invention to purge both sieve beds. This is achieved by first purging the Type 5A or 4A bed, and then passing the purge gas laden with carbon monoxide through the Type 13X bed. This procedure results in very substantial savings in purge gas requirements.

Referring to the figure, a portion of the purified hydrogen gas stream 34 is utilized to provide purge gas stream 35. Stream 35 passes via valve 36, lines 37 and 38, valve 39 and line 40 into unit 41. Unit 41 is an impurity-laden molecular sieve bed corresponding in composition and function to unit 10 previously described. During the regeneration cycle, unit 41 is heated by passing steam or other medium into coils 42, to maintain a temperature preferably in the range 350° F.–400° F. A temperature higher than 400° F. is undesirable here since high pressure steam would be required and also because the Type 5A sieve material used in unit 41 is adversely affected by temperatures exceeding about 450° F. In this connection it is significant to note that regeneration of unit 41 is accomplished at a temperature below 400° F. according to the present invention, because in the prior adsorption cycle water vapor had been completely removed before the partially purified gas was passed through the bed. If water vapor had been adsorbed in bed 41, considerably higher regeneration temperatures in the range of 450° F. to 500° F. would have been required. In order to insure reasonably rapid regeneration, a minimum temperature of 350° F. is usually required in unit 41. Unit 41 may be regenerated at lower temperatures in the range of 250° F. to 300° F., but the time period required for complete regeneration would be lengthened thus possibly upsetting normal cyclic operation in some cases.

The purge gas stream together with associated impurities, principally carbon monoxide, now leaves bed 41 via line 43, and passes via valve 44, lines 45, 46 and 47, valve 48 and line 49 into unit 50. Unit 50 is an impurity-laden molecular sieve bed corresponding in composition and function to unit 9 previously described. During the regeneration cycle, unit 50 is heated, preferably by steam passed into coil 51. A temperature range between 350° F. and 400° F. is maintained in unit 50, these operating limits are preferred for reasons similar to those specified above in connection with the regeneration of unit 41. Since unit 50 consists of molecular sieve Type 13X, it is purged of water vapor at a relatively low temperature, in the 350° F. to 400° F. range. Thus an overall advantage of the process of the present invention resides in the combination of complete purification utilizing Type 4A or 5A for final cleanup and carbon monoxide removal, together with regeneration at relatively low temperatures via avoidance of water vapor adsorption on the Type 4A or 5A sieve.

The purge gas stream, now laden with the principal impurities carbon dioxide and water vapor as well as carbon monoxide, leaves unit 50 via line 52. The impurity-laden purge gas stream 52 now passes via valve 53 and lines 54 and 55 to a discharge vent or utilization as fuel for the reformer furnace burner or other purposes. In some cases it may be highly advantageous to recycle the purge gas stream 55 as a component of the total input process streams 1 or 5, thus recovering hydrogen values and reducing the size or capacity of units 4 and 6 required for a given plant output.

The alternation from adsorption to regeneration cycles is accomplished in a simple manner by opening valves which are designated as being closed by being shown in solid black on the figure, and closing other corresponding valves shown as open on the figure. The regeneration of units 50 and 41 is of course followed first by a cooling period in which the temperature of these units is reduced to the proper levels for adsorption. Then, to adsorb in units 50 and 41 and regenerate in units 9 and 10, the following valves are opened: 56, 57, 58, 59, 60, 61, 62 and 63. Other corresponding valves are closed, as follows: 13, 53, 48, 20, 28, 44, 39 and 32. Thus the flow pattern is reversed, with adsorption and hydrogen purification taking place on the right side of the figure and regeneration on the left side of the figure. Heating and cooling units are also reversed accordingly. It should be understood that, in practice, the reversal of flows as outlined above is accomplished by a procedure and sequence of valve adjustments which precludes and avoids any carry-over of impurities into the purified gas and also avoids water vapor adsorption in units 41 or 10.

An example of the application of this process in a commercial installation will now be described.

*Example*

A crude hydrogen gas stream produced by a hydrocarbon-steam reform followed by a CO-oxidation had the following analysis (dry basis):

|  | Volume percent |
|---|---|
| Carbon dioxide | 20.20 |
| Carbon monoxide | 0.36 |
| Hydrogen | 79.01 |
| Methane | 0.07 |
| Nitrogen | 0.36 | and was saturated with water vapor as produced, at 95° F. and 75 p.s.i.g. The crude gas stream entered the Type 13X molecular sieve bed at a rate of 5650 s.c.f.h. This bed contained Type 13X adsorbent in the form of $\frac{1}{16}''$ pellets and effectively removed all water vapor and carbon dioxide from the gas stream during a two-hour adsorption cycle. Isothermal adsorption was attained using 10 g.p.m. of recirculating 85° F. cooling water.

The partially purified gas stream was cooled from 95° F. to 30° F. in a refrigerated brine heat exchanger, and then entered the Type 5A molecular sieve bed. This bed contained 1/16" pellet adsorbent, and effectively removed all carbon monoxide from the gas stream during the two-hour adsorption cycle. No cooling was provided for the Type 5A bed, and the final gas stream left this bed at a temperature of 35° F. The net purified gas output was 3460 s.c.f.h., and this gas contained less than 10 p.p.m. carbon dioxide, 10 p.p.m. carbon monoxide, and had a dew point of −100° F.

During this two-hour adsorption cycle, a corresponding pair of impurity-laden sieve beds were regenerated. The regeneration cycle for the Type 13X bed consisted of 1½ hours heating at 358° F. using 135 p.s.i.g. steam and ½ hour cooling using 165 g.p.m. of 85° F. cooling water. The regeneration cycle for the Type 5A bed consisted of one hour heating at 358° F. using 135 p.s.i.g. steam and one hour cooling with 20° F. brine. Refrigeration requirements consisted of 7½ tons for the 20° F. brine during the Type 5A bed regeneration cycle, and ¾ ton for partially purified gas cooling in the brine heat exchanger.

Purge gas was required at the rate of 800 s.c.f.h., and this gas was obtained as a side stream from the total purified gas output. The purge gas stream was passed through the Type 5A and Type 13X beds in series, and was then discharged to the atmosphere through an explosion-proof vent. The purge gas as vented was explosive, and contained the previously adsorbed water vapor, carbon dioxide and carbon monoxide as well as hydrogen.

The above discussion of a preferred embodiment of this invention is intended primarily for descriptive purposes and should not be interpreted to limit or restrict the invention. Various modifications and alterations in the heat transfer systems, or known processing modifications found in the prior art, may be readily applied and utilized in conjunction with this invention. Thus, for example, the crude gas stream as obtained from the CO-oxidation unit may be subjected to a preliminary scrubbing step using a known carbon dioxide adsorbent solution such as potassium carbonate or ethanolamine, to recover the bulk of the carbon dioxide in the gas stream as a relatively pure co-product for subsequent process utilization. Another possible alternative, in cases where significant amounts of inerts would not be objectionable in the hydrogen product, would be to direct the partially purified gas stream containing only carbon monoxide as a significant impurity through the well-known catalytic methanation process whereby the carbon monoxide is reacted with hydrogen to produce methane and water. A further alternative procedure similar to this would be to only partially remove carbon monoxide by means of the molecular sieve, and then catalytically convert the residual carbon monoxide to methane. Other obvious process alternatives will occur to those skilled in the art.

I claim:

1. Process of purifying an impure hydrogen gas stream containing carbon dioxide, water vapor and carbon monoxide as principal impurities which comprises adsorbing impurity consisting principally of carbon dioxide and water vapor by passing said impure hydrogen gas stream in contact with a first adsorbent comprising a dehydrated zeolite with the general chemical formula $$0.83 \pm 0.05 Na_2O \cdot 1.00 Al_2O_3 \cdot 2.48 \pm 0.03 SiO_2$$

and having a crystal structure with mutually connected intra-crystalline voids which will admit molecules with critical dimensions up to 13 angstroms, recovering a partially purified hydrogen gas stream, adsorbing impurity consisting principally of carbon monoxide by passing said partially purified hydrogen gas stream in contact with a second adsorbent comprising a dehydrated zeolite selected from the group consisting of sodium zeolite with the general chemical formula $$0.96 \pm 0.04 Na_2O \cdot 1.00 Al_2O_3 \cdot 1.92 \pm 0.09 SiO_2$$

and sodium-calcium zeolite derived from said sodium zeolite in which a portion of the sodium ions in said sodium zeolite are replaced by calcium ions, said second adsorbent having a crystal structure with mutually connected intra-crystalline voids which will admit molecules with critical dimensions up to about 5 angstroms, and recovering a purified hydrogen gas stream essentially free of said principal impurities.

2. Process of claim 1 in which said impure hydrogen gas stream is passed in contact with said first adsorbent at a temperature between about 70° F. and 150° F., and said partially purified gas stream is cooled and passed in contact with said second adsorbent at a temperature between about 30° F. and −40° F.

3. Process of claim 1 in which said second adsorbent consists of a dehydrated sodium-calcium zeolite in which the molar ratio of calcium to sodium ions is about 3:1.

4. Method of regenerating impurity-laden zeolites resulting from the purification process of claim 1 which comprises terminating the flow of impure hydrogen gas stream, passing an inert purge gas stream in contact with said second adsorbent whereby previously adsorbed impurity is removed from said second adsorbent and displaced into said purge gas stream, thereafter passing said purge gas stream containing displaced impurity in contact with said first adsorbent whereby previously adsorbed impurity is removed from said first adsorbent and displaced into said purge gas stream, and discharging said purge gas stream containing impurities removed from said second and first adsorbents.

5. Method of claim 4 in which the purge gas stream comprises substantially pure hydrogen.

6. Method of claim 4 in which said adsorbents are heated to a temperature between about 350° F. and 400° F. during regeneration.

7. Process of purifying an impure hydrogen feed gas stream containing carbon dioxide, water vapor and carbon monoxide as principal impurities which comprises contacting said impure hydrogen gas stream with a first adsorbent comprising a dehydrated zeolite with the general chemical formula $$0.83 \pm 0.05 Na_2O \cdot 1.00 Al_2O_3 \cdot 2.48 \pm 0.03 SiO_2$$

and having a crystal srtucture with mutually connected intra-crystalline voids which will admit molecules with critical dimensions up to 13 angstroms, whereby impurity consisting principally of carbon dioxide and water vapor is adsorbed and thereby removed from said gas stream, cooling said first adsorbent during said gas contact by heat exchange with cooling water in heat exchange means, said cooling water having a purity at least as high as steam condensate, removing warmed cooling water from said heat exchange means, recooling said cooling water by separate external heat exchange with a separate cooling medium, and recycling said cooling water for further heat exchange cooling of said first adsorbent, recovering a residual gas stream after contact with said first adsorbent, said residual gas stream comprising partially purified hydrogen, contacting said residual gas stream with a second adsorbent comprising a dehydrated zeolite selected from the group consisting of sodium zeolite with the general chemical formula $$0.96 \pm 0.04 Na_2O \cdot 1.00 Al_2O_3 \cdot 1.92 \pm 0.09 SiO_2$$

and sodium-calcium zeolite derived from said sodium zeolite in which a portion of the sodium ions in said sodium zeolite are replaced by calcium ions, said second adsorbent having a crystal structure with mutually connected intra-crystalline voids which will admit molecules with critical dimensions up to about 5 angstroms, whereby impurity consisting principally of carbon monoxide is adsorbed and thereby removed from said residual gas stream, recovering a purified hydrogen gas stream essentially free of said princpal impurities; periodically terminating the flow of impure feed gas stream, and regenerating said first adsorbent by passing steam instead of high purity cooling water through said heat exchange means in heat exchange with said first adsorbent during the period of termination of impure feed gas flow.

8. Process of claim 7 in which said separate cooling medium comprises plant cooling water.

References Cited in the file of this patent

UNITED STATES PATENTS

| | | |
|---|---|---|
| 1,661,104 | Barneby | Feb. 28, 1928 |
| 1,919,781 | Forrest et al. | July 25, 1933 |
| 2,257,540 | Smellie | Sept. 30, 1941 |
| 2,527,430 | Kniveton | Oct. 24, 1950 |
| 2,810,454 | Jones et al. | Oct. 22, 1957 |
| 2,822,888 | MacLaren | Feb. 11, 1958 |
| 2,850,114 | Kehde et al. | Sept. 2, 1958 |
| 2,882,243 | Milton | Apr. 14, 1959 |
| 2,882,244 | Milton | Apr. 14, 1959 |
| 2,938,864 | Fleck et al. | May 31, 1960 |
| 2,944,627 | Skarstrom | July 12, 1960 |
| 2,992,703 | Vasan et al. | July 18, 1961 |
| 3,037,338 | Thomas | June 5, 1962 |
| 3,067,271 | Fleck et al. | Dec. 4, 1962 |
| 3,078,638 | Milton | Feb. 26, 1963 |
| 3,078,639 | Milton | Feb. 26, 1963 |
| 3,094,569 | Thomas | June 18, 1963 |
| 3,102,012 | Dowd | Aug. 27, 1963 |

OTHER REFERENCES

Chonan, C. S.: Developments, Processes and Technology in Chem. Engr., pages 60–62, August 10, 1959.